(12) United States Patent
Thomas et al.

(10) Patent No.: US 8,925,091 B2
(45) Date of Patent: Dec. 30, 2014

(54) SYSTEM AND METHOD FOR EVALUATION IN A COLLABORATIVE SECURITY ASSURANCE SYSTEM

(75) Inventors: Ashley Thomas, Atlanta, GA (US); Ashwin Paranjpe, Sunnyvale, CA (US)

(73) Assignee: Dell Products, LP, Round Rock, TX (US)

( * ) Notice: Subject to any disclaimer, the term of this patent is extended or adjusted under 35 U.S.C. 154(b) by 139 days.

(21) Appl. No.: 13/224,009

(22) Filed: Sep. 1, 2011

(65) Prior Publication Data

US 2013/0061327 A1 Mar. 7, 2013

(51) Int. Cl.
*H04L 29/06* (2006.01)
*G06F 21/57* (2013.01)

(52) U.S. Cl.
CPC .......... *H04L 63/1433* (2013.01); *G06F 21/577* (2013.01)
USPC ................. 726/25; 726/15; 726/24; 709/223; 709/224; 703/13

(58) Field of Classification Search
CPC .. G06F 1/577; H04L 63/1433; H04L 63/1416
USPC ........... 709/223, 224, 225; 726/13, 15, 24, 25
See application file for complete search history.

(56) References Cited

U.S. PATENT DOCUMENTS

| | | | |
|---|---|---|---|
| 2001/0034847 A1* | 10/2001 | Gaul, Jr. .................. | 713/201 |
| 2003/0212908 A1* | 11/2003 | Piesco ..................... | 713/201 |
| 2006/0031938 A1* | 2/2006 | Choi ........................ | 726/25 |
| 2006/0218640 A1* | 9/2006 | Lotem et al. ............. | 726/25 |
| 2006/0259974 A1* | 11/2006 | Marinescu et al. ....... | 726/25 |
| 2008/0168550 A1* | 7/2008 | Choudhury et al. ...... | 726/13 |
| 2008/0271124 A1* | 10/2008 | Nisbet et al. ............. | 726/4 |
| 2009/0044270 A1 | 2/2009 | Shelly et al. | |
| 2009/0320137 A1* | 12/2009 | White et al. ............. | 726/25 |
| 2011/0078793 A1 | 3/2011 | Orgill | |
| 2011/0131324 A1 | 6/2011 | Chaturvedi et al. | |
| 2011/0178942 A1* | 7/2011 | Watters et al. .......... | 705/325 |
| 2011/0191579 A1 | 8/2011 | Xiao et al. | |
| 2011/0208849 A1* | 8/2011 | Barnett et al. ........... | 709/223 |

* cited by examiner

*Primary Examiner* — Andrew Nalven
*Assistant Examiner* — Huan V Doan
(74) *Attorney, Agent, or Firm* — Larson Newman, LLP

(57) ABSTRACT

A security assurance system includes a back-end application and a computing resource. The back-end application receives a selection of a network security product that is associated with a protected network, and receives a selection of a threat from a plurality of threats stored on the security assurance system. The computing resource launches an evaluation of the security product based upon the threat, and reports to a user of the security assurance system a result of the evaluation.

15 Claims, 4 Drawing Sheets

SYSTEM AND METHOD FOR EVALUATION IN A COLLABORATIVE SECURITY ASSURANCE SYSTEM

FIELD OF THE DISCLOSURE

The present disclosure generally relates to information handling systems, and more particularly relates to evaluation of an information handling system in a collaborative security assurance system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. Other teachings can be used in this application, and the teachings can be used in other applications and with different types of architectures, such as a client-server architecture, a distributed computing architecture, or a middleware server architecture and associated resources.

Figure 1:
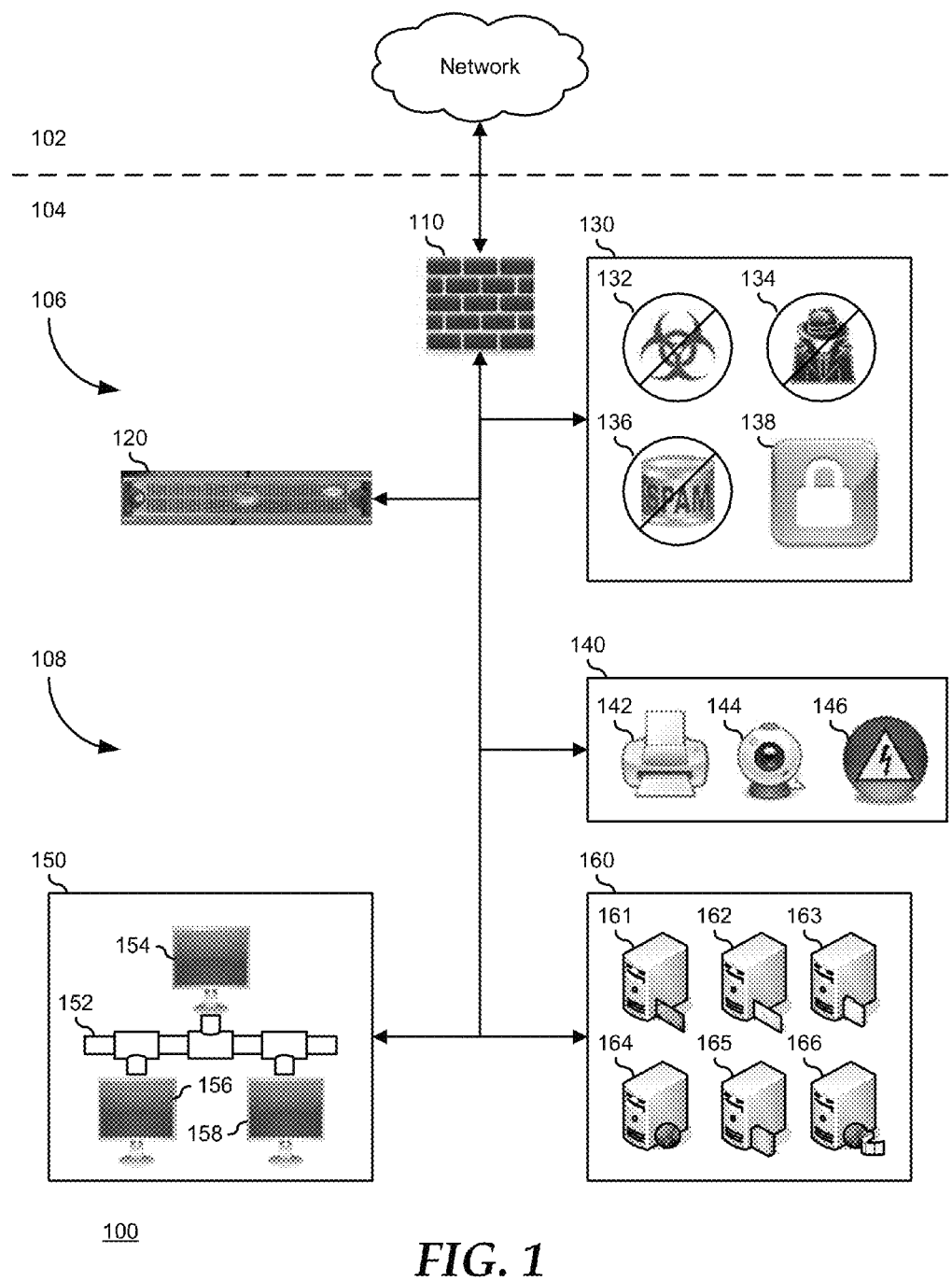
FIG. 1 is a block diagram of a secure network according to an embodiment of the present disclosure.

FIG. 1 illustrates a secure network 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, secure network 100 includes an external network 102 and a protected network 104. Protected network 104 includes a protection system 106, and a functional system 108. Protection system 106 includes a firewall 110, an intrusion detection/prevention system (IDPS) 120, and protection utilities 130. Functional system 108 includes network attached devices 140, a user network 150, and network servers 160. Firewall 110 operates to permit or deny network transactions based upon a set of rules, including packet filtering rules, application filtering rules, stateful packet inspection rules, identity based rules, or other rules, as needed or desired. Firewall 110 also operates to provide network address translation (NAT) to hide the identities of the other elements of protected network 104. IDPS 120 operates to monitor activities within protected network 104 for malicious activities or policy violations, to report and log information about such activities, and to prevent the malicious activities and policy violations. As such, IDPS 120 examines transactions on protected network 104, identifies heuristics and patterns of known attacks (called malicious signatures), alerts an operator of protected network 104 of the attacks, and terminates the attacks on the protected network. Protection utilities 130 include anti-virus software 132, anti-spyware software 134, anti-spam software 136, and a transport layer security/secure socket layer (TLS/SSL) 138. Protection utilities 130 can also include other protection systems as needed or desired.

Network attached devices 140 include a network attached printer 142, a network attached camera 144, and a network attached uninterruptible power supply 146. Network attached devices 140 can also include other network attached devices, such as one or more additional printers, cameras, or uninterruptible power supplies, or other network attached devices as needed or desired. User network 150 includes a network system 152, and user systems 154, 156, and 158. Network system 152 can include a local area network, a wide area network, a wireless area network, or another network system. User systems 154, 156, and 158 can include information handling systems, such as desktop or laptop computers, thin clients, other user systems, or a combination thereof. Network servers 160 include an electronic commerce (e-commerce) server 161, an electronic mail (e-mail) server 162, a file server 163, a web server 164, a proxy server 165, and a media server 166. Network servers 160 can include other network servers, as needed or desired. In a particular embodiment, network servers 160 represent different functions that are performed on one or more information handling systems, and can include virtual servers in a managed environment. Moreover, one or more of e-commerce server 161, e-mail server 162, file server 163, web server 164, proxy server 165, and media server 166 can be implemented in a de-militarized zone that includes a sub-network that is exposed to external network 102, and that is isolated from protected network 104.

In operation, protection system 106 ensures that the operations performed in functional system 108 are reliable, safe, and free from external and internal threats, and that access to the resources of protected network 104 is granted only to authorized users and according to established access rules. For example, firewall 110 can include rules to block user systems 154, 156, and 158 from accessing certain internet protocol (IP) addresses or from using certain transmission control protocol (TCP) and user datagram protocol (UDP) ports, and rules to prevent such IP addresses and ports from accessing the elements of protected network 104. Such rules can be established based upon the existence of known threats that emanate from such IP addresses or that use such ports. IDPS 120 can include signatures of known exploits, and can monitor transactions that are permitted onto protected network 104 by firewall 110. For example, a file received from an IP address that is deemed to be safe by firewall 110 may nevertheless include a known exploit, such as a virus or Trojan. When IDPS 120 detects transactions that match a signature associated with a known exploit, then the IDPS blocks the transaction from reaching its destination, such as by dropping the network packets associated with the transaction. In a particular embodiment, IDPS 120 provides hardware functionality, such as the ability to monitor transactions, in combination with software functionality such as signature based anti-virus, anti-malware, anti-spam, and TLS/SSL functionality. As such, anti-virus software 132, anti-spyware software 134, anti-spam software 136, and TLS/SSL 138 can represent capabilities that are included in IDPS 120. In another embodiment, anti-virus software 132, anti-spyware software 134, anti-spam software 136, and TLS/SSL 138 provide functionality complimentary to IDPS 120.

The elements of protected network 104 include hardware, such as one or more information handling systems, dedicated peripheral devices, or other hardware, as needed or desired, and also include software, such as stand-alone software products, firmware or middleware products associated with particular hardware devices, basic functional software of an information handling system, such as a platform basic input/output system (BIOS) or an extensible firmware interface (EFI), or other software, as needed or desired. The landscape of hardware and software in protected network 104 is constantly changing, as hardware devices are added or replaced, firmware and middleware for the hardware devices is added or updated, software products are added or updated, or other hardware and software of the protected network are added, removed, or updated. As a result of the changing landscape of protected network 104, the functions of protection system 106 need to be updated and modified to ensure that all aspects of the changing landscape continue to be protected. In addition to the changing landscape of protected network 104, the threat environment is constantly changing as weaknesses are discovered in the protection offered by protection system 106, and as security holes are found in the hardware and software of protected network 104 and are exploited. For example, new viruses, Trojans, malware, spyware, and other exploits are constantly being developed to take advantage of any weakness or security hole. In addition, hacking activity can also be targeted at weaknesses and security holes.

Thus the operator of protected network 104 needs to be constantly vigilant in monitoring the landscape of the protected network and the threat environment, both from within the protected network and from external network 102. For example, as new IP addresses are identified with known exploits, the operator can update the rules in firewall 110 to block access to these IP addresses, new signatures can be provided to IDPS 120 to detect and prevent newly discovered exploits, and new definition files can be added to anti-virus system 132 to detect newly discovered viruses and Trojans. Also, hardware software settings can be updated within functional system 108 to provide greater security.

Figure 2:
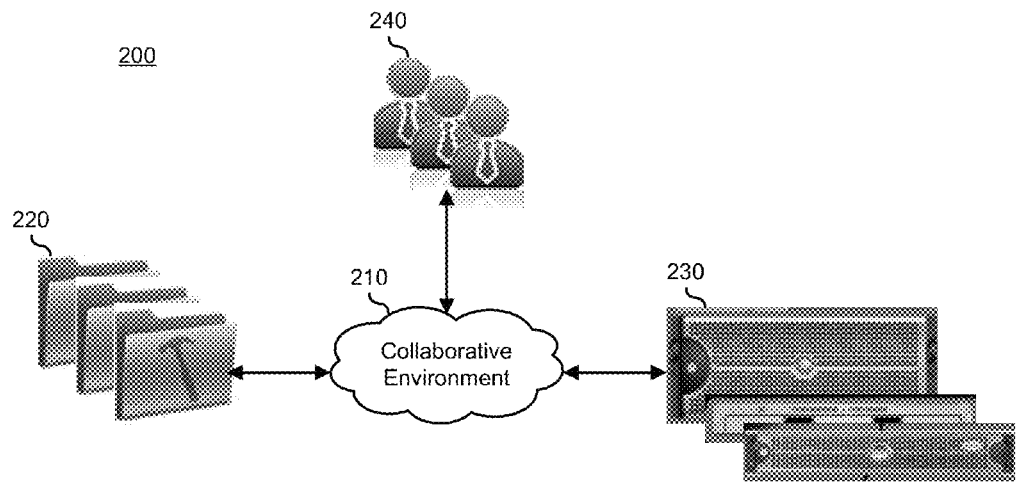
FIG. 2 is a block diagram illustrating a security assurance system according to an embodiment of the present disclosure.

FIG. 2 illustrates a security assurance system 200 for evaluating the protection capabilities of a protected network similar to protected network 100. System 200 includes a collaborative environment 210, a security development community 220, a security product community 230, and a protected network administration community 240. Collaborative environment 210 represents a hosted service where communities 220, 230, and 240 interact to share knowledge, methods, and procedures for securing protected networks, and for evaluating the security products used in implementing the protected networks. As such, collaborative environment 210 can include a web-based hosted service, a proprietary hosted service, or another hosted service. Security development community 220 represents a wide base of support for sharing information regarding security threats, intrusion detection, anti-hacking, and other problems which can affect protected networks, and can include experts in particular threat areas who share their expertise within security assurance system 200. In addition, security development community 220 can also include the pooled resources and feedback from individual users of various security products. Security product community 230 represents the producers of security hardware and software. Protected network administration community 240 represents the administrators of numerous separate protected networks.

The focus of security assurance system 200 is to provide security evaluation services to protected network administration community 240, but benefits accrue to security development community 220 and to security product community 230, as well. The evaluation services provided by security assurance system 200 are based upon the information provided by security development community 220 and security product community 230. Security assurance system 200 is an open, collaborative working environment, so the evaluation services are transparent. That is, the methods, procedures, and processes used in the evaluation process are shared. The evaluation services are highly customizable, and can be repeated on a routine basis in order to evaluate against the rapidly changing network landscapes and threat environments. The evaluation services can be highly product specific, or can be product agnostic, as needed or desired.

Security development community 220 provides threat information regarding known threats to collaborative environment 210. The threat information can take the form of packet captures and signatures of known malicious traffic and of known benign traffic, IP addresses and port usages for known malicious traffic, firewall and IDPS rules, publicly shared test results, configuration recommendations, and other information relevant to the configurations, settings, and structure of protected networks. When information is provided to collaborative environment 210, a user associated with security development community 220 can provide additional information such as comments and suggestions, relation to other known or emerging threats, alternative embodiments of the threats, configurations and settings that can eliminate the threat, and other additional information related to the threat information. By providing the threat information and the additional information to collaborative environment 210, security development community 220 shares knowledge about the latest exploits and potential protections, and gains real-time information about trends in the threat environment.

Security product community 230 provides information related to the security products that they produce. For example, a producer of anti-virus software can upload their software to collaborative environment 210, and can also provide routine updates to the virus files associated with the anti-virus software. In this way, the anti-virus software is available for evaluation against emerging threats, to determine if the anti-virus protection is robust. The anti-virus software is also available to be used in evaluating a protected network that employs the anti-virus software. As such, collaborative environment 210 includes a managed environment that can instantiate one or more virtual machines that run the various software products that are provided to the collaborative environment. In another example, a producer of a hardware product, such as a firewall or an IDPS can upload a simulation of their hardware for evaluation purposes, and the managed environment can run the hardware simulation for use in evaluating a protected network that employs the hardware product. In yet another example, a producer of a hardware product can provide access to a reference version of their hardware product through a secure connection with collaborative environment 210, such as a virtual private network or another secure connection. In this way, the reference version of the hardware product can be evaluated, and users of the hardware product can evaluate the performance of their product against the performance of the reference version. By providing access to hardware and software products to collaborative environment 210, security product community 230 gains rapid access to the shared knowledge of the latest exploits, and quickly determines how their products are responding to the changing threat environment.

Protected network administration community 240 utilizes the security evaluation services of security assurance system 200 to ensure that the respective protected networks are secure in the face of the changing threat environment. In a particular embodiment, protected network administration community 240 accesses collaborative environment 210 to select the hardware and software in a particular protected network with the hardware and software information provided by security product community 240, and receive recommendations based upon the information provided by the security product community and security development community 220. Based upon the recommendations, an administrator can adjust settings, configurations, firewall and IDPS rules for their particular protected network.

In another embodiment, protected network administrator community 240 sets up and runs evaluations of simulated protected networks on collaborative environment 210. For example, an administrator can access a web portal, and, based upon the hardware and software in their protected network, select the hardware and software information that matches their protected network, and select settings and configurations for the hardware and software information that matches the actual settings and configurations of the protected network, thereby creating on collaborative environment 210 a simulated protected network. The administrator can then review the threat information to select packet captures and signatures, IP addresses and port usages, and other test conditions, set up an evaluation of the simulated protected network based upon the selected threat information, and can launch the evaluation. Collaborative environment 210 then runs the evaluation against the simulated protected network and provides the administrator with a report of the results of the evaluation. Where the producer of a hardware product provides access to a reference version of their hardware product, a secure connection can be established so that the evaluation is run on the reference version. The results of the evaluation include a list of alerts that are generated by the simulated protected network based upon the threats included in the evaluation. The administrator can review the alerts to determine if there are any holes in the protection afforded by the administrator's protected network.

In yet another embodiment, protected network administrator community 240 sets up evaluations on collaborative environment 210, and runs the evaluations on protected networks within the protected network administrator community. For example, an administrator can set up an evaluation as described above, establish a secure connection between collaborative environment 210 and the protected network, and launch the evaluation. Collaborative environment 210 then runs the evaluation against the protected network and provides the administrator with a report of the results of the evaluation.

In a particular embodiment, collaborative environment 210 operates to prioritize the packet captures, signatures, firewall and IDPS rules, configuration recommendations, and other information. Here, information provided from security development community 220 can be ranked based upon various factors, such as by giving a priority rating to information provided by a particular developer based upon feedback from users of assurance system 200, by ranking information based upon popularity, frequency of usage, or trending of usage, by grouping threat information based upon a usage model of a group of protected networks within protected network administrators community 240, or based upon another criteria for prioritizing threat information. In a particular example, grouping threat information based upon the usage model can include grouping protected networks according to the type of information security needed by the operators of the protected networks. Here financial institutions can have different security criteria and different protection needs than medical facilities. As such, threat information that is particular to banking transaction security can be given a higher priority when the user is an administrator of a bank's protected network.

In a particular embodiment, collaborative environment 210 provides a web-based hosted environment with various web pages associated with the different actions taken by communities 220,230, and 240. For example, collaborative environment 210 can provide public access to portions of the hosted environment, such as to message boards and discussion groups of general interest. Collaborative environment 210 can also provide private access to other portions of the hosted environment that are accessed pursuant to log-in authentication, and that provide access to more specific message boards and discussion groups that are associated with a particular type of protected network, product, or threat, and to functional areas of the collaborative environment. For example, members of security developer community 220 can have access to web pages for entering threat information, including for uploading packet captures and signatures, members of security product community 230 can have access to web pages for listing hardware or uploading software, for linking to hardware reference versions, and for providing updates and other information related to the products, and protected network administrator community 240 can have access to web pages for selecting products and threat information, and for launching evaluations. Note that, as described herein, the rolls of communities 220, 230, and 240 are separate and distinct, but this is not necessarily so, and members of a particular community can act in the rolls of the other communities as needed or desired. For example, a member of security product community 230 or of network administrators community 240 can provide packet captures or other information to collaborative environment 210.

In another embodiment, collaborative environment 210 supports the selective sharing of packet captures, test results, configurations, and other information. For example, for reasons of privacy, trust, relevance, or other reasons, communities 220, 230, and 240 can form sub-communities with access to shared resources of collaborative environment 210. Here, the prioritization of artifacts, packet captures, test results, configurations, and other information can be based upon the needs, desires, or relevance to the sub-community.

Figure 3:
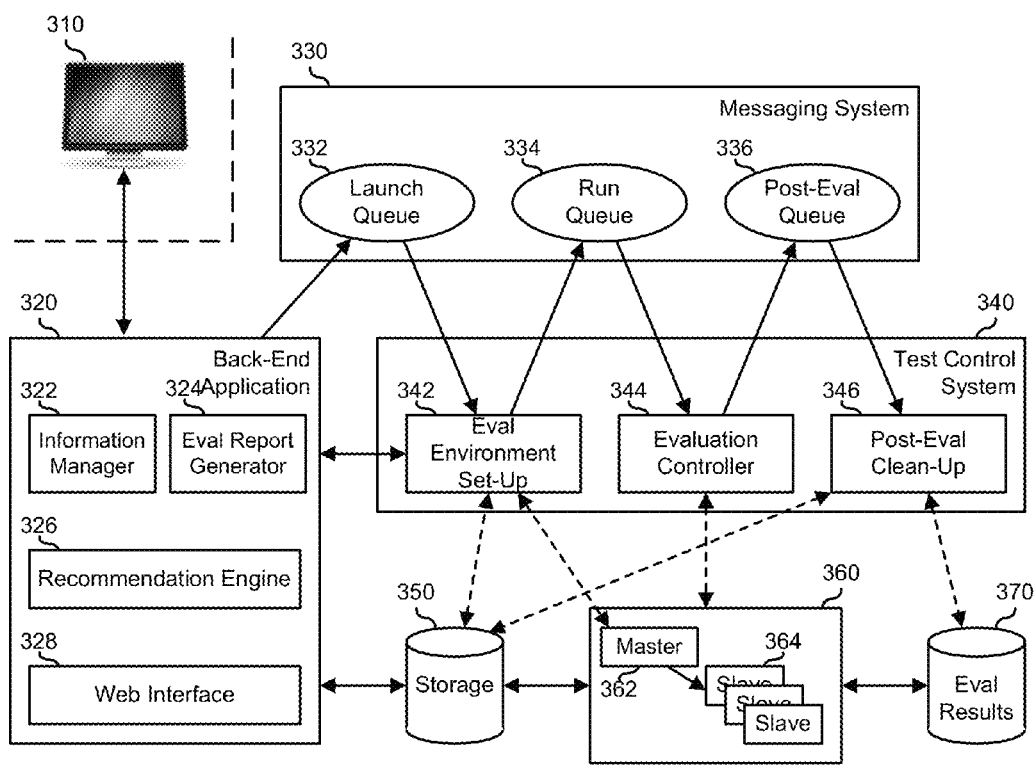
FIG. 3 is a block diagram illustrating a security assurance system similar to the security assurance system of FIG. 2, according to an embodiment of the present disclosure.

FIG. 3 illustrates an embodiment of a collaborative environment 300 similar to collaborative environment 210, and including a back-end application 320, a messaging system 330, a test control system 340, a storage device 350, a computing cluster 360, and an evaluation result database 370. Collaborative environment 300 is connected to one or more communities 310 via a network connection such as the Internet. Back-end application 320 includes an information manager 322, an evaluation report generator 324, a recommendation engine 326, and a web interface 328. Messaging system 330 includes a launch queue 332, a run queue 334, and a post-evaluation queue 336. Test control system 340 includes an evaluation environment set-up module 342, an evaluation controller 344, and a post-evaluation clean-up module 346. Computing cluster 360 includes a master processing block 362, and one or more slave processing blocks 364.

In operation, collaborative environment 300 provides similar functionality to collaborative environment 200, as described above. In particular, a user in a particular community 310 logs into web interface 328 to gain access to the functionality of collaborative environment 300. For example, if a user is a part of a developer community, the user can log in to web interface 328 and access web pages for entering threat information. The threat information can be managed by information manager 322 and stored on storage device 350 for use by other users. If a user is part of a product community, the user can log on and access web pages for listing hardware or uploading software, for linking to hardware reference versions, and for providing updates and other information related to the products. The listings and links can be managed by information manager 322 and stored on storage device 350 for use by other users. If the user is part of an administrator community, the user can log on and access web pages for selecting products and threat information, and for launching evaluations. The selected threat information is provided by recommendation engine 326. When an evaluation is to be run, back end application 320 provides the selected products and threat information to evaluation environment set-up module 342, and queues the evaluation in to launch queue 332. Evaluation environment set-up module 342 accesses the products and threat information from storage device 350 to set up the conditions for the evaluation. When evaluation environment set-up module 342 has prepared the evaluation environment, the evaluation is provided to run queue 334 to schedule the evaluation. When run queue 334 is ready to run the evaluation, the evaluation controller schedules the necessary computing resources in compute cluster 360, loads the evaluation environment from evaluation environment set-up module 342 into the allocated resources and launches the evaluation.

When compute cluster 360 has completed the evaluation the results are provided to evaluation results database 370, and evaluation controller 344 places a post-evaluation task in post-evaluation queue 336 for competing the evaluation. Post-evaluation queue 336 schedules clean-up activities into post-evaluation clean-up module 346, and the post-evaluation clean-up module de-allocates the compute resources from compute cluster 360, compiles the evaluation results from evaluation results data base 370, and provides the compiled results to evaluation report generator 324 for communication to the user.

In a particular embodiment, collaborative environment 300 includes dedicated resources for performing the functions described herein. In another environment, collaborative environment 300 includes resources that are distributed in a cloud computing environment, such as the Amazon Elastic Compute Cloud or the IBM SmartCloud environments. Moreover, a provider of collaborative environment 300 can provide Security Evaluation as a Service (SEaaS) products based upon the functionality of the collaborative environment.

Figure 4:
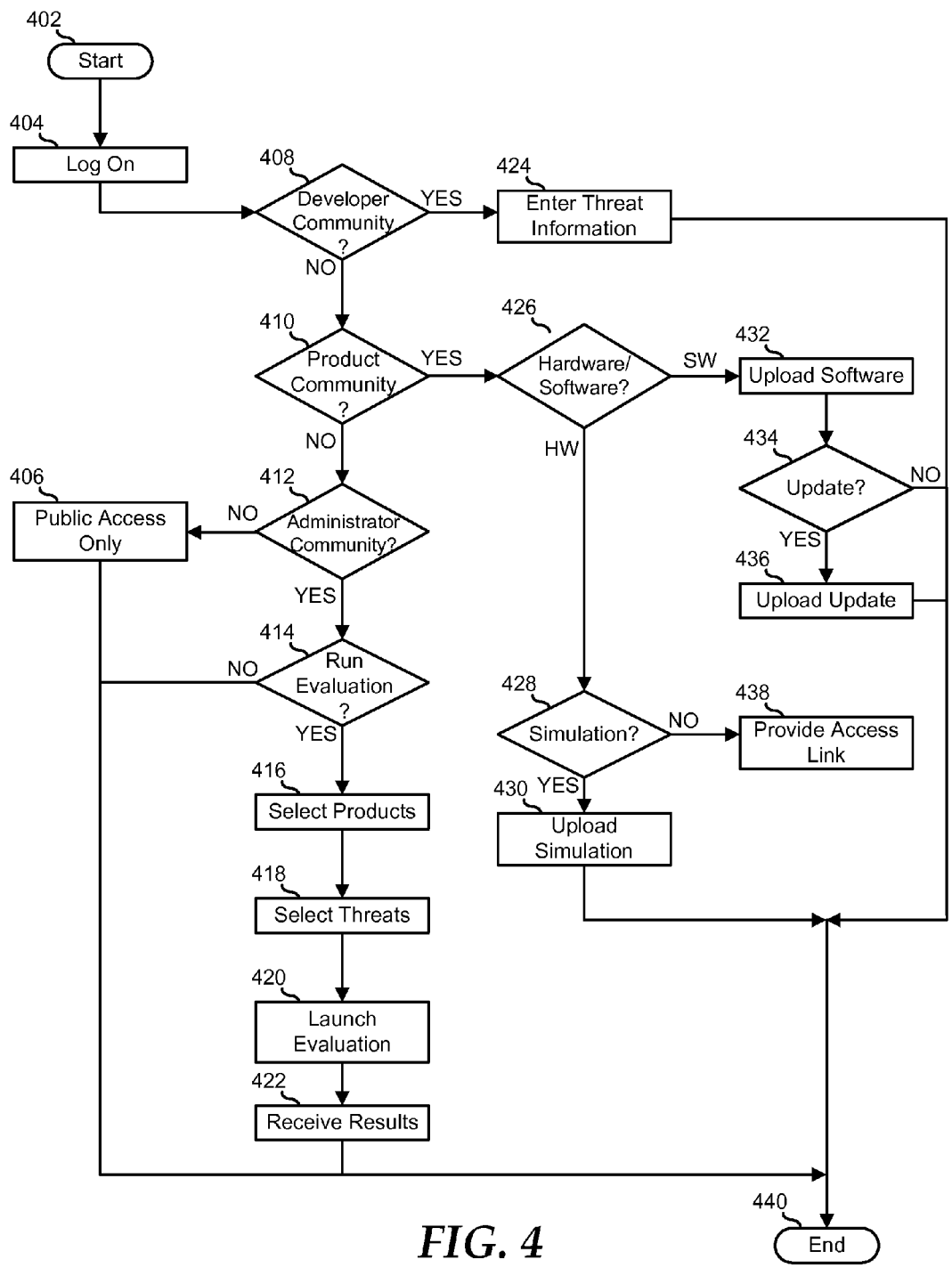
FIG. 4 is a flowchart illustrating a method of evaluating a secure network in a collaborative security assurance system, according to an embodiment of the present disclosure.

FIG. 4 illustrates a method of evaluating a secure network similar to secure network 100 in a collaborative security assurance system similar to security assurance system 200. The method starts at block 402, and a user logs on to the collaborative security assurance system in block in block 404. For example, a user in community 310 can log in to web interface 328. A decision is made as to whether or not the user is part of a developer community in decision block 408. If so, the "YES" branch of decision block 408 is taken, the user is directed to a page where threat information is entered into the collaborative security assurance system in block 424, and the method ends at block 440. If the user is not part of a developer community, the "NO" branch of decision block 408 is taken and a decision is made as to whether or not the user is part of a developer community in decision block 410. If not, the "NO" branch of decision block 410 is taken, and the method continues at decision block 412, as described below. If so, the "YES" branch of decision block 410 is taken, and the user is directed to a page where the user can select whether a product to be entered into the collaborative security assurance system is a hardware product or a software product in decision block 426. If the product is a hardware product, the "HW" branch of decision block 426 is taken and the method continues in decision block 428, as described below.

If the product is a software product, the "SW" branch of decision block 426 is taken, the user is directed to a page where the user can upload the software product to the collaborative security assurance system in block 432, and the user is directed to a page where the user can select whether or not the software product includes an update in decision block 434. If not, the "NO" branch of decision block 434 is taken and the method ends in block 440. If so, the "YES" branch of decision block 434 is taken, and the user is directed to a page where the user can upload the update into the collaborative security assurance system in block 436, and the method ends in block 440. If, as described above, the product to be entered is a hardware product and the "HW" branch of decision block 426 is taken, the user is directed to a page where the user can select whether the hardware product to be entered includes a simulation in decision block 428. If so, the "YES" branch of decision block 428 is taken, the user is directed to a page where the user can upload the simulation to the collaborative security assurance system in block 430, and the method ends in block 440. If not, the "NO" branch of decision block 428 is taken, the user is directed to a page where the user can provide an access link to reference hardware to the collaborative security assurance system in block 438, and the method ends in block 440.

If, as described above, the user is not part of a product community and the "NO" branch of decision block 410 is taken, a decision is made as to whether or not the user is part of an administrator community in decision block 412. If not, the "NO" branch of decision block 412 is taken, the user is limited to pages that are designated for public access only, and the method ends in block 440. If so, the "YES" branch of decision block 412 is taken and the user is directed to a page where the user can select whether or not to run an evaluation in decision block 414. If not, the "NO" branch of decision block 414 is taken and the method ends in block 440. If so, the user is directed to a page where the user selects products that represent the user's protected network in block 416. The user is directed to a page where the user selects threats to be used in the evaluation in block 418. The evaluation is launched in block 420, the results of the evaluation are received by the user in block 422, and the method ends in block 440.

Figure 5:
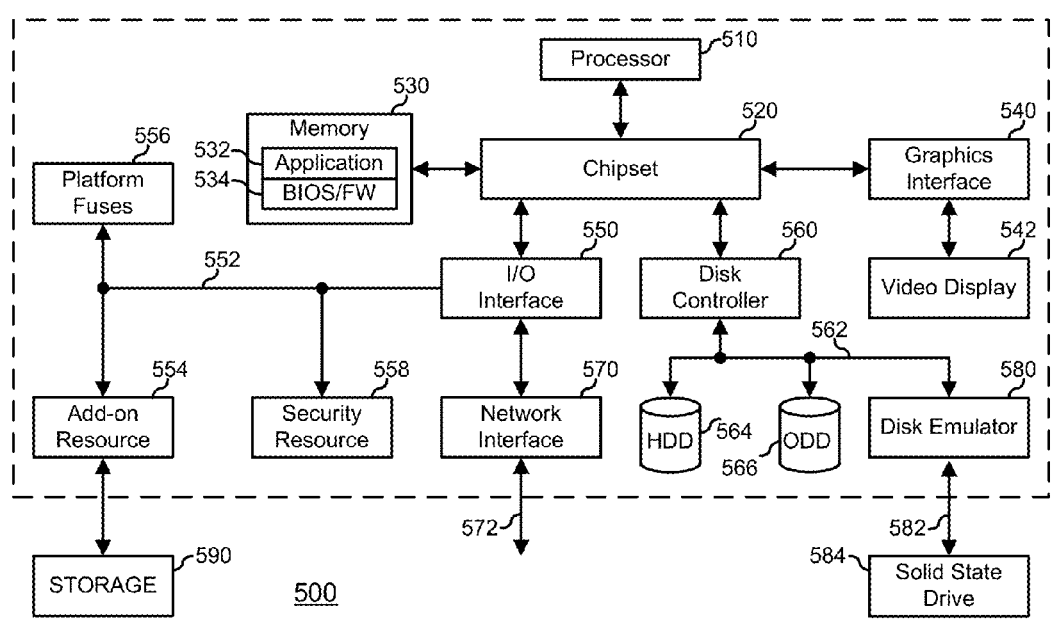
FIG. 5 is a block diagram illustrating an information handling system according to an embodiment of the present disclosure.

FIG. 5 is a block diagram illustrating an embodiment of an information handling system 500, including a processor 510, a chipset 520, a memory 530, a graphics interface 540, an input/output (I/O) interface 550, a disk controller 560, a network interface 570, and a disk emulator 580. In a particular embodiment, information handling system 500 is used to carry out one or more of the methods described herein. In another embodiment, one or more of the systems described herein are implemented in the form of information handling system 500.

Chipset 520 is connected to and supports processor 510, allowing the processor to execute machine-executable code. In a particular embodiment (not illustrated), information handling system 500 includes one or more additional processors, and chipset 520 supports the multiple processors, allowing for simultaneous processing by each of the processors and permitting the exchange of information among the processors and the other elements of the information handling system. Chipset 520 can be connected to processor 510 via a unique channel, or via a bus that shares information among the processor, the chipset, and other elements of information handling system 500.

Memory 530 is connected to chipset 520. Memory 530 and chipset 520 can be connected via a unique channel, or via a bus that shares information among the chipset, the memory, and other elements of information handling system 500. In another embodiment (not illustrated), processor 510 is connected to memory 530 via a unique channel. In another embodiment (not illustrated), information handling system 500 includes separate memory dedicated to each of the one or more additional processors. A non-limiting example of memory 530 includes static random access memory (SRAM), dynamic random access memory (DRAM), non-volatile random access memory (NVRAM), read only memory (ROM), flash memory, another type of memory, or any combination thereof.

Graphics interface 540 is connected to chipset 520. Graphics interface 540 and chipset 520 can be connected via a unique channel, or via a bus that shares information among the chipset, the graphics interface, and other elements of information handling system 500. Graphics interface 540 is connected to a video display 542. Other graphics interfaces (not illustrated) can also be used in addition to graphics interface 540 as needed or desired. Video display 542 includes one or more types of video displays, such as a flat panel display, another type of display device, or any combination thereof.

I/O interface 550 is connected to chipset 520. I/O interface 550 and chipset 520 can be connected via a unique channel, or via a bus that shares information among the chipset, the I/O interface, and other elements of information handling system 500. Other I/O interfaces (not illustrated) can also be used in addition to I/O interface 550 as needed or desired. I/O interface 550 is connected via an I/O interface 552 to one or more add-on resources 554. Add-on resource 554 is connected to a storage system 590, and can also include another data storage system, a graphics interface, a network interface card (NIC), a sound/video processing card, another suitable add-on resource or any combination thereof. I/O interface 550 is also connected via I/O interface 552 to one or more platform fuses 556 and to a security resource 558. Platform fuses 556 function to set or modify the functionality of information handling system 500 in hardware. Security resource 558 provides a secure cryptographic functionality and includes secure storage of cryptographic keys. A non-limiting example of security resource 558 includes a Unified Security Hub (USH), a Trusted Platform Module (TPM), a General Purpose Encryption (GPE) engine, another security resource, or a combination thereof.

Disk controller 560 is connected to chipset 520. Disk controller 560 and chipset 520 can be connected via a unique channel, or via a bus that shares information among the chipset, the disk controller, and other elements of information handling system 500. Other disk controllers (not illustrated) can also be used in addition to disk controller 560 as needed or desired. Disk controller 560 includes a disk interface 562. Disk controller 560 is connected to one or more disk drives via disk interface 562. Such disk drives include a hard disk drive (HDD) 564, and an optical disk drive (ODD) 566, and can include one or more disk drive as needed or desired. ODD 566 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 560 is connected to disk emulator 580. Disk emulator 580 permits a solid-state drive 584 to be coupled to information handling system 500 via an external interface 582. External interface 582 can include industry standard busses such as USB or IEEE 1394 (Firewire) or proprietary busses, or any combination thereof. Alternatively, solid-state drive 584 can be disposed within information handling system 500.

Network interface device 570 is connected to I/O interface 550. Network interface 570 and I/O interface 550 can be coupled via a unique channel, or via a bus that shares information among the I/O interface, the network interface, and other elements of information handling system 500. Other network interfaces (not illustrated) can also be used in addition to network interface 570 as needed or desired. Network interface 570 can be a network interface card (NIC) disposed within information handling system 500, on a main circuit board such as a baseboard, a motherboard, or any combination thereof, integrated onto another component such as chipset 520, in another suitable location, or any combination thereof. Network interface 570 includes a network channel 572 that provide interfaces between information handling system 500 and other devices (not illustrated) that are external to information handling system 500. Network interface 570 can also include additional network channels (not illustrated).

Information handling system 500 includes one or more application programs 532, and Basic Input/Output System and Firmware (BIOS/FW) code 534. BIOS/FW code 534 functions to initialize information handling system 500 on power up, to launch an operating system, and to manage input and output interactions between the operating system and the other elements of information handling system 500. In a particular embodiment, application programs 532 and BIOS/FW code 534 reside in memory 530, and include machine-executable code that is executed by processor 510 to perform various functions of information handling system 500. In another embodiment (not illustrated), application programs and BIOS/FW code reside in another storage medium of information handling system 500. For example, application programs and BIOS/FW code can reside in HDD 564, in a ROM (not illustrated) associated with information handling system 500, in an option-ROM (not illustrated) associated with various devices of information handling system 500, in storage system 590, in a storage system (not illustrated) associated with network channel 572, in another storage medium of information handling system 500, or a combination thereof. Application programs 532 and BIOS/FW code 534 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   storing, by a first developer associated with a first protected network, a first threat, wherein the first threat is stored to a security assurance system, wherein the security assurance system includes a plurality of threats;
   storing, by a second developer associated with a second protected network, a second threat, wherein the second threat is stored to the security assurance system;
   providing a first security product to the security assurance system;
   selecting, by a first administrator associated with the first protected network, the first security product, wherein the first security product is associated with a second security product of the first protected network;
   selecting, by the first administrator, the first threat;
   launching on the security assurance system a first evaluation of the first security product based upon the first threat;
   reporting to the first administrator a first result of the first evaluation;
   updating the second security product in response to the first result;
   selecting, by a second administrator associated with the second protected network, the first security product, wherein the first security product is associated with a third security product of the second protected network;
   selecting, by the second administrator, the second threat, and preventing the selecting, by the second administrator, the first threat;
   launching on the security assurance system a second evaluation of the first security product based upon the second threat;
   reporting to the second administrator a second result of the second evaluation; and
   updating the third security product in response to the second result.

2. The method of claim 1, further comprising:
   launching a simulation of the second security product on a computing resource;

wherein launching the evaluation further comprises transmitting the threat to the simulation.

3. The method of claim 2, further comprising:
determining that the simulation of the second security product successfully blocked the threat; and
wherein reporting the result is in response to the determining.

4. The method of claim 1, further comprising:
receiving from the security assurance system a configuration for the second security product in response to selecting the first security product, wherein the configuration is associated with the protected network; and
wherein the evaluation of the first security product includes evaluating the configuration.

5. The method of claim 1, wherein the threat is selected based on a recommendation by the security assurance system.

6. A security assurance system comprising:
a back-end application; and
a hardware computing resource;
wherein the back-end application is operable to:
store a first threat, wherein the security assurance system includes a plurality of threats, and wherein the first threat is received form a first developer associated with a first protected network;
store a second threat, wherein the second threat is received from a second developer associated with a second protected network;
receive a first security product;
receive a first selection of the first security product from a first administrator associated with the first protected network, wherein the first security product is associated with a second security product of the first protected network;
receive a second selection of the first threat from the first administrator;
receive a third selection of the first security product from a second administrator associated with the second protected network, wherein the first security product is associated with a third security product of the second protected network; and
receive a fourth selection, by the second administrator, of the second threat, and prevent the selecting, by the second administrator, of the first threat; and
wherein the computing resource is operable to:
launch a first evaluation of the first security product based upon the first threat;
report to the first administrator a first result of the first evaluation;
update the second security product in response to the first result;
launch on the security assurance system a second evaluation of the first security product based upon the second threat;
report to the second administrator a second result of the second evaluation; and
update the third security product in response to the second result.

7. The security assurance system of claim 6, wherein the computing resource is further operable to:
launch a simulation of the second security product on a computing resource; and
transmit the threat to the simulation.

8. The security assurance system of claim 7, wherein the computing resource is further operable to:
determine that the simulation of the second security product successfully blocked the threat; and
wherein reporting the result is in response to the determining.

9. The security assurance system of claim 6, wherein the back-end application is further operable to:
receive from the security assurance system a configuration for the second security product in response to selecting the first security product, wherein the configuration is associated with the protected network;
wherein the evaluation of the first security product includes evaluating the configuration.

10. The security assurance system of claim 6, wherein the threat is selected based on a recommendation by the security assurance system.

11. Machine-executable code for an information handling system, wherein the machine-executable code is embedded in a non-transitory storage medium and includes instructions for carrying out a method, the method comprising:
storing, by a first developer associated with a first protected network, a first threat, wherein the first threat is stored to a security assurance system, wherein the security assurance system includes a plurality of threats;
storing, by a second developer associated with a second protected network, a second threat, wherein the second threat is stored to the security assurance system;
providing a first security product to the security assurance system;
selecting, by a first administrator associated with the first protected network, the first security product, wherein the first security product is associated with a second security product of the first protected network;
selecting, by the first administrator, the first threat;
launching on the security assurance system a first evaluation of the first security product based upon the first threat;
reporting to the first administrator a first result of the first evaluation;
updating the second security product in response to the first result;
selecting, by a second administrator associated with the second protected network, the first security product, wherein the first security product is associated with a third security product of the second protected network;
selecting, by the second administrator, the second threat, and preventing the selecting, by the second administrator, the first threat;
launching on the security assurance system a second evaluation of the first security product based upon the second threat;
reporting to the second administrator a second result of the second evaluation; and
updating the third security product in response to the second result.

12. The machine-executable code of claim 11, the method further comprising:
launching a simulation of the second security product on a computing resource;
wherein launching the evaluation further comprises transmitting the threat to the simulation.

13. The machine-executable code of claim 12, the method further comprising:
determining that the simulation of the second security product successfully blocked the threat; and
wherein reporting the result is in response to the determining.

14. The machine-executable code of claim 11, the method further comprising:

receiving from the security assurance system a configuration for the second security product in response to selecting the first security product, wherein the configuration is associated with the protected network; and wherein the evaluation of the first security product includes evaluating the configuration.

15. The machine-executable code of claim 11, wherein the threat is selected based on a recommendation by the security assurance system.

\* \* \* \* \*